United States Patent [19]

Safford

[11] 4,404,426
[45] Sep. 13, 1983

[54] CRYPTOGRAPHIC TELEGRAPHY PROGRAMMING SYSTEM

[75] Inventor: Laurance F. Safford, Washington, D.C.

[73] Assignee: American Standard Inc., New York, N.Y.

[21] Appl. No.: 197,203

[22] Filed: May 23, 1962

[51] Int. Cl.³ .......................... H04L 9/00; G05B 1/00; G06F 7/02
[52] U.S. Cl. ............................ 178/22.03; 178/22.19; 340/146.2; 340/347 R; 377/37; 377/54; 377/64
[58] Field of Search ................ 307/88; 328/49, 158, 328/115, 116, 117, 37, 38; 178/23.1, 22.03, 22.12, 22.19; 340/347, 345, 347 R, 146.2; 325/40, 122, 37; 235/175, 176, 178

[56] References Cited

U.S. PATENT DOCUMENTS 3,250,855  5/1966  Vasseur ........................... 178/22.12

OTHER PUBLICATIONS

"Two Psuedo-Random Digit Generators", Zieler, Lincoln Labs, 1954.

Primary Examiner—Sal Cangialosi
Attorney, Agent, or Firm—Robert G. Crooks; James J. Salerno, Jr.; John P. Sinnott

EXEMPLARY CLAIM

1. Apparatus for producing multiple combinations of parallel output binary signals for controlling an anti-jam or other form of telegraphy system comprising four parallel feedback shift registers, a pair of serial to parallel converters, each having an input terminal, means for combining the output signals of said shift registers for producing two separate serial signals, means for coupling one of said serial signals to the input terminal of one of said converters, means for coupling the other of said serial signals to said input terminal of the other of said converters and means for changing the output signal of one of said converters when said separate signals are identical for a predetermined number of binary digits, said feedback shift registers having pluralities of separate stages and a feedback mixer having input terminals connected to the last and certain other three of said stages, and an output terminal connected to the first of said stages.

63 Claims, 6 Drawing Figures

CRYPTOGRAPHIC TELEGRAPHY PROGRAMMING SYSTEM

The present invention relates generally to communications and more particularly to control apparatus for an anti-jam radio communications system employing tone hopping within a wide band of signal frequencies.

Previous systems for controlling tone-hopping apparatus that generate anti-jam radio signals have proven undesirable because the tones were recorded on magnetic tapes which proved very difficult to start in synchronism and to run with sufficient synchronism for efficient operation. Another prior anti-jam control system employing multiple output channels has not provided a sufficiently high degree of inherent security because both internal and external biasing of the control signals has resulted. This is detrimental because it is a potential aid in mathematical analysis of the system.

Accordingly, it is an object of the present invention to provide apparatus for generating a plurality of parallel binary output control signals utilized primarily for anti-jam radio communication systems.

It is another object of the present invention to provide an anti-jam radio communications control system wherein maximum security of a transmitted message is achieved with no internal or external bias of the control and transmitted signals, so that no possibility of reconstructing the system through mathematical analysis of either the transmitted signals or their control signals exists.

In order to achieve zero internal and external biasing of the control signals generated as well as to provide other essential security features it has been found necessary to provide new output mixers and new feedback mixers. As a result, it is a further object of the present invention to provide a new and improved nonlinear mixer circuit for the feedback shift registers. In order to minimize the chance of any biasing in the output control signals, it has been found necessary to develop a new and improved nonlinear mixing circuit for combining the output signals of the several shift registers.

In controlling the operation of the tone generators utilized in the complete anti-jam tone hopping system, the use of set and reset pulses for the flip-flops that control the tone generators has been found to be a most desirable arrangement. Set and reset pulses eliminate the necessity for close synchronization of clock pulses, thus reducing circuit complexity. The set pulses are generated by a serial to parallel converter that is responsive to the serial signal combined from the several shift registers. These set pulses actuate a flip-flop that controls the switching of one of the tone generators. The flip-flop remains in its set condition until a reset pulse, which is the complement of the set pulse, is generated by the same stage of the serial to parallel converter that produced the set pulse. As a result, it is an additional object of the present invention to provide a new and improved serial to parallel binary signal converter that produces a plurality of complementary pairs of parallel output signals.

In order to prevent the mark and space tones generated by the pair of serial to parallel converters that are supplied by independent input signals from jamming each other, it is necessary for the parallel mark and space signals produced at any one incident to be different in at least one element. Accordingly, it is a still further object of the present invention to provide new and improved apparatus for producing a correction pulse to change the output signal of one of the converters when the signals supplied thereto are alike over a predetermined count.

In order to further increase the security of the machine and the number of possible combinations of output control signals generated thereby, switching circuits are employed in order to change the connections between certain of the shift register stages and the feedback mixer. This is preferably accomplished by means of rotary selector switches which are easy to handle and are not greatly subject to human error. The number of signal combinations that the machine may produce is further increased by employing switching circuits to connect the feedback mixer either as a linear element having either two or four input signals supplied thereto, or as a nonlinear four-input element. Variable preloading of the various shift registers employed in this invention is accomplished by means of additional rotary selector switches or by other switching means.

It is also possible according to the present invention to employ a shift register wherein the output signal from the feedback mixer is selectively coupled to either the set winding or to the inhibit winding of the first physical stage of the shift register. The number of possible combinations of output signals is increased even further by employing further selector switches wherein the output signals from the various feedback shift registers are coupled to different input terminals of the nonlinear output mixers. The binary, serial output signals from the output mixers employed in this circuit are supplied to the pair of previously mentioned serial to parallel converters and are also coupled to a comparator unit that supplies a correction pulse to one of converters when the serial signals are alike for a predetermined number of clock-pulses.

By use of this structure it is possible to obtain the desired 18 parallel pairs of complementary pulses for controlling the mark and space tone generators employed in the anti-jam telegraphy system. By employing feedback shift registers of 13, 15, 17 and 19 stages, the full operating cycle produced by the machine has a length of approximately 866,000,000 years when a normal 60 word per minute pulse rate is employed; thus there will be no reoccurrences of the output control signals for 866,000,000 years.

The above and still further objects, features and advantages of the present invention will become apparent upon consideration of the following detailed description of one specific embodiment thereof, especially when taken in conjunction with the accompanying drawings, wherein:

FIG. 1 of the drawings is a block diagram of the entire apparatus according to a preferred embodiment of the invention;

Figure 1:
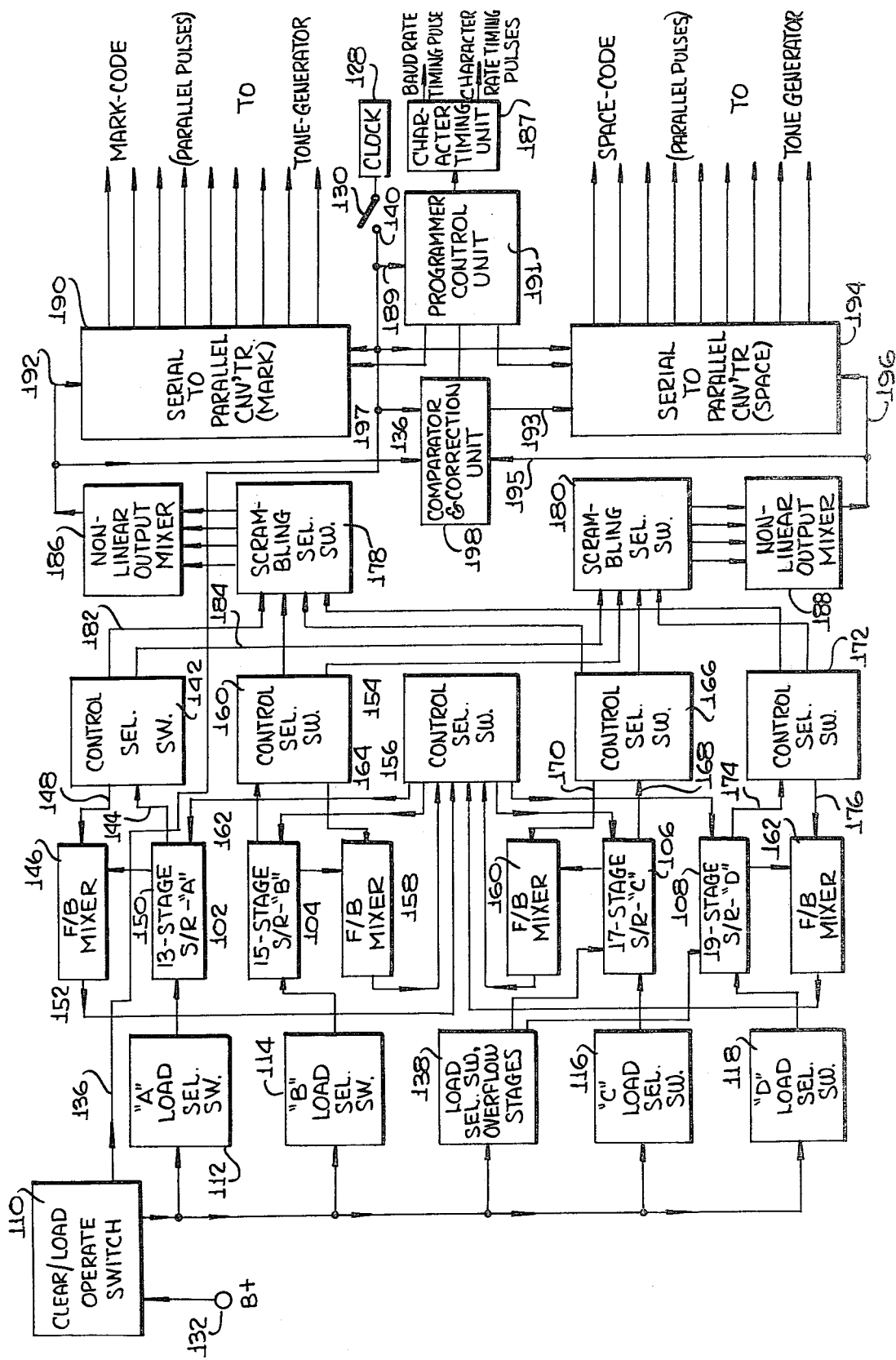

Referring now to the block diagram of the entire system, FIG. 1, four shift registers 102, 104, 106, and 108 are preloaded with binary information by means of switch 110 and load selector switches 112, 114, 116 and 118, respectively. Each shift register 102, 104, 106 and 108 must contain a different co-prime number of stages to obtain maximum length pseudo random signals after the feedback shift register outputs are combined, by the apparatus described infra. Shift register 102 contains eleven physical and thirteen actual stages while shift registers 104, 106 and 108 contain fifteen, seventeen and nineteen actual stages, respectively.

Switch 110 comprises a spring biased, manually operated switch having three positions. The switch armature is connected to B+ terminal 132. When the apparatus is switched on, the switch armature is manually brought to its position most remote from rest and a prolonged pulse is supplied from the B+ supply connected via circuit 136 to the drive winding of each of the elements utilized in the entire apparatus. This prolonged pulse erases any binary "ONES" (positive magnetic signals) that may have been previously stored in the circuit elements and returns all of them to the binary "zero" stage.

After spring biased switch 110 is released from the clear or erase terminal, it automatically sweeps past a further terminal and thereby preloads certain stages of shift registers 102, 104, 106 and 108 by means of leads connected between the further terminal and load selector switches 112, 114, 116 and 118, respectively. This also automatically preloads the first stage of the two ring counters shown in FIG. 4. Each load selector switch preferably comprises multicontact, multi-shaft, ganged wafer switches that permit preloading of the respective shift register stages. By appropriately turning the knobs of the load selector switches various connection combinations between the shift registers and the switch 110 are established. The switches have enough levels to permit establishment of all of the different possible combinations which it may be desirable to preload in the respective shift registers. However, if the load selective switches do not contain a sufficient number of levels, a further load selector switch 138 may be utilized for preloading additional stages of the shift registers 104, 106 and 108. It is to be understood, of course, that plug board connectors may be substituted for the load selector switches employed on the block diagram. It has been found by practice, however, that selector switches are preferable to plug board connectors because of the probable human error resulting from the latter.

After the shift register stages have been preloaded by means of switch 110, switch 130, ganged to switch 110, alights on contact 140 and drive pulses are supplied from clock pulse generator 128 to each of the subsystems employed in the circuit by means of lead 136.

Ten of the eleven physical stages of shift register 102 are coupled to control selector switch 142 by means of multi-lead cable 144. Control selector switch 142 normally couples three selected stages of shift register 102 to the feedback mixer 146 by way of cable 148. The last stage of shift register 102 is always directly coupled to the "N" input terminal of feedback mixer 146 by means of lead 150. Control selector switch 142 is preferably a multiwafer rotary switch, having a plurality of contacts. A total of 24 or 27 permissible combinations from the various stages of shift register 102 that are to be supplied by means of leads 148 to the feedback mixer 146 are prewired into switch 142. As in the case of the load selector switches, it is to be realized that it is possible to substitute plug board connectors for the multiwafer switches.

Feedback mixer 146 preferably contains both a linear and non-linear mixer circuit and control selector switch 142 contains connections to determine whether or not it is to be connected as a linear or non-linear element. Also, switch 142 enables the feedback mixer to receive only one selective input signal rather than the selected three from shift register 102. The output signal of feedback mixer 146 is coupled back to the first stage of shift register 102 by means of lead 152, control selector switch 154 and twin-leads 156, one going to the input winding and the other to the inhibit winding. Control selector switch 154 permits shift register 102 to be utilized in either of two different circuit configurations (described more fully in connection with FIG. 2), thereby doubling the number of combinations produced by the shift register 102. Feedback mixers 158, 160 and 162 are respectively associated with shift registers 104, 106 and 108. These feedback mixers are of identical construction to that of feedback mixer 146. Control selector switch 160 is utilized to control which of the twelve different output signals from shift register 104 are supplied as the three selected input signals to feedback mixer 158 by means of leads 162 and 164. Control selector switch 166, connected between shift register 106 and feedback mixer 160 by means of leads 168 and 170, determines which of the fourteen output signals from the various stages of shift register 106 are the three selected input signals supplied to the feedback mixer 160. Similarly, control selector switch 172 connects a selected three of the sixteen stages of the shift register 108 to the three input terminals of feedback mixer 162 by means of leads 174 and 176. Control selector switch 154 determines whether the feedback signals for shift registers 104, 106 and 108 will be used to "set" or to "inhibit" the first physical stages, as well as performing this function for shift register 102. The last stages of shift registers 104, 106 and 108 are connected directly to the "N" input terminals of feedback mixers 158, 160, and 162, respectively.

By establishing the connections between the various shift registers and the feedback mixers, a pulse train that does not reoccur for $2^n - 1$ bits is produced by each of the feedback shift registers, where n is the number of actual stages in each of the registers. The distinction between actual and physical stages results because of the two bit delay introduced by each of the feedback mixers. Thus, shift register 102 containing eleven physical stages has thirteen actual stages because feedback mixer 146 contains two phantom stages.

The signals from two stages of each shift register are supplied by means of each control selector switch to different scrambling selector switches 178 and 180. Thus, the signal from one of the stages of shift register 102 is coupled to scrambling selector switch 178 by means of control selector switch 142 and lead 182 and another signal from a further stage of shift register 102 is coupled to scrambling selector switch 180 by means of control selector switch 142 and lead 184. Scrambling selector switches 178 and 180 are constructed in a manner somewhat similar to that of the control and load selector switches, previously mentioned. Each scrambling selector switch permits twenty-four additional combinations of signals to be obtained from the final output terminals. The scrambled output signals from selector switches 178 and 180 are fed to non-linear mixers 186 and 188, respectively. The scrambling selector switches serve to permute the signals applied thereto to their various output leads. Thus, the signal from shift register 102 on lead 182 may be shifted to any of the four output leads of selector switch 178 by appropriately changing the switch position.

Non-linear output mixers 186 and 188 combine the four signals applied thereto and convert them into single serial binary signals. The signal from mixer 186 is coupled to serial to parallel converter 190 by lead 192 while the output signal of mixer 188 is supplied to an additional serial to parallel converter 194 by lead 196.

Each of the serial to parallel converters simultaneously produces nine pairs of complimentary pulses at its output leads. The output signals from the converters 190 and 194 are produced at a rate of one-ninth that of the serial signal supplied thereto because the nine parallel simultaneous output signals are inhibited except on every ninth clock pulse.

The output signals from mixers 186 and 188 are also fed to comparator and correction unit 198 by means of leads 197 and 195, respectively. The comparator and correction unit serves to produce an output pulse whenever the signals from mixers 186 and 188 have been identical for a nine-bit timing period. This output pulse is supplied to an input terminal of converter 194 by means of lead 193 and changes one of the parallel output pulses from converter 194. Thus, the signals produced by converters 190 and 194 cannot be identical to each other at any instant. This comparison apparatus insures that the same command code cannot be sent simultaneously to the mark tone generator switches and to the space tone generator switches employed in the transmitting or receiving equipment with which this programming apparatus is utilized. By insuring that the coincident signals produced from the two serial to parallel converters are different, the possibility of self-jamming by the generated tone-hopping signals is eliminated.

Control of the serial to parallel converters 190 and 194 as well as comparator and corrector unit 198 is effected by programmer control unit 191 which supplies different timing signals thereto under the control of clock 128, connected thereto by means of a switch 130, terminal 140 and lead 189. The programmer control unit is also coupled to a further timing unit 187 to produce baud rate and character rate timing pulses in order to insure synchronism of the programmer unit with the remainder of the tone hopping system.

This apparatus is highly effective for producing eighteen different pairs of complimentary, parallel binary control signals which will not reoccur in the same sequence for approximately 866,000,000 years if a standard telegraphy transmitting code of sixty words per minute is utilized.

Figure 2:
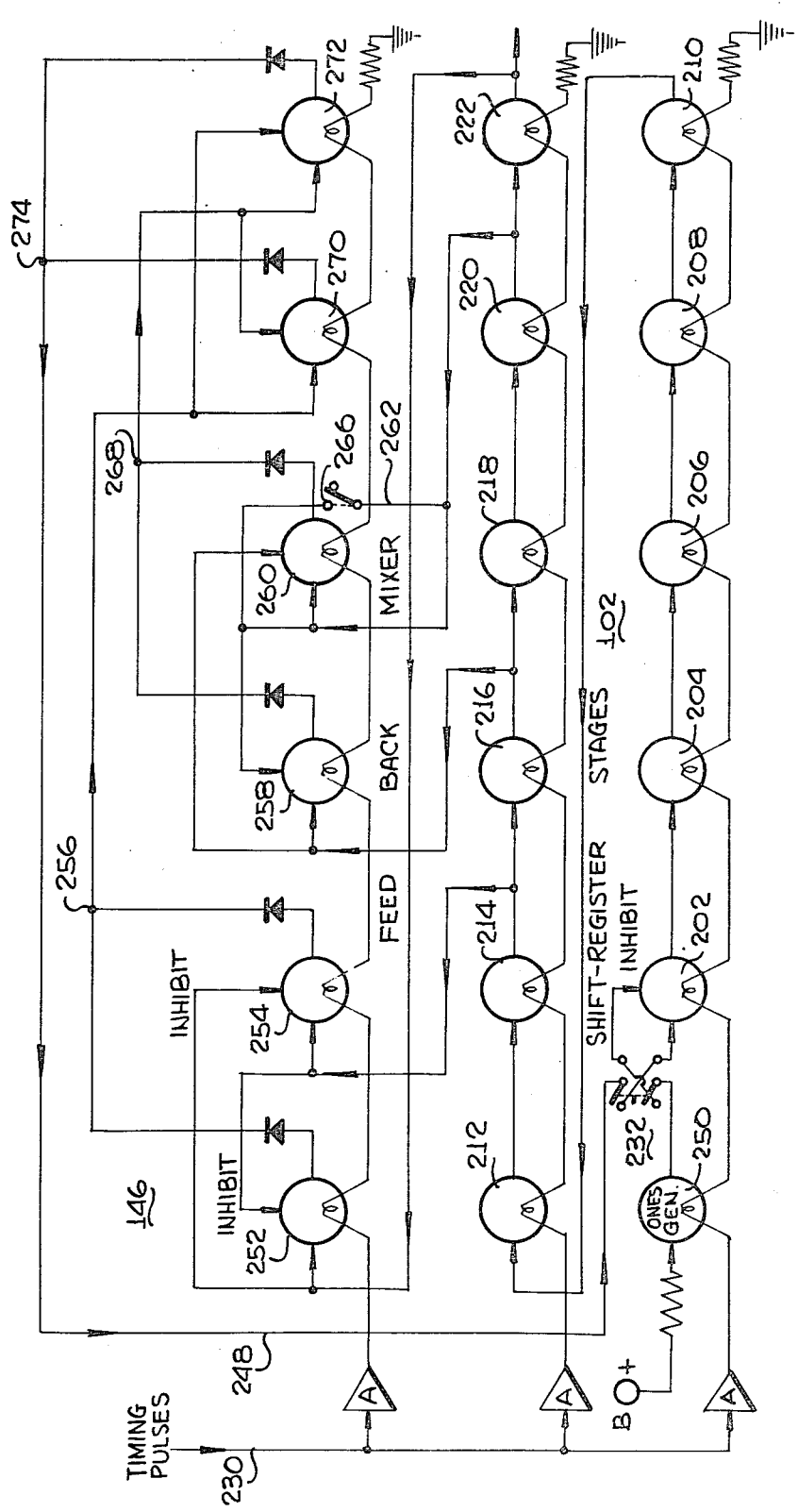
FIG. 2 is a schematic diagram of a preferred form of a modified feedback shift register according to the present invention.

FIG. 2 of the drawings discloses the improved feedback shift register according to this invention. The shift register disclosed in this figure is exemplary of shift registers 102, 104, 106 and 108, illustrated in the block diagram of FIG. 1, but it specifically discloses only the structure of shift register 102 having eleven physical and thirteen actual stages.

In this figure and throughout the remainder of the figures in this disclosure, unless otherwise indicated, a circle is designated as a bistable magnetic shift register unit or core. The lead on the lefthand side of the circle is connected to the input or set winding, the lead at the bottom of the circle is connected to the "drive" or "advance" winding, the lead feeding into the top portion of the circle is connected to the inhibit winding of the core and the lead on the righthand side of the circle is connected to the output winding of the respective core. Although many of the cores do not perform the inhibit function and may not necessarily have an inhibit winding, for purposes of uniformity and maintenance it may be desirable to employ like cores in all instances. It should be understood that every "core" has two "output" terminals, namely:

"Voltage (output) Terminal", connected directly to the temporary storage capacitor and the "near" side of the "pulse shaping resistor", and characterized by marked voltage change and negligible external current in the associated circuit;

"Current (output) terminal", connected to the "far" side of the "pulse shaping resistor" and characterized by negligible voltage change and heavy external current in the associated circuit. Unless other specified, the terms "output winding" or "output terminal" will be understood to mean the "current output terminal", as described above.

An input pulse on the input or set lead of each core normally results in an output pulse on the output lead the next time a timing or clock pulse is applied to the drive winding of each core, there being an inherent delay of one driving pulse between each input and its corresponding output. Pulses applied to the inhibit winding of each core serve to block or inhibit the loading of the core, and hence the generation of a subsequent output pulse at the output lead, even when a "set" pulse is simultaneously applied to the input winding.

Each of the shift register stages, cores 202-222 may be preloaded with binary information by means of switch 110, described in connection with FIG. 1, in a manner well known to those skilled in the art; the "loading" circuits are not shown in FIG. 2. In keeping with the requirement that at least one stage of the shift register be preloaded with a "ZERO" binary signal, and at least one stage with a "ONE" signal, the load selector switches 112, 114, 116 and 118 are so internally connected (strapped) that at least 1 out of each group of 4 (or 5) cores and not more than 3 out of 4 (or 5) cores are preloaded with "ONES". Cores 202-222 of the shift register are coupled together in the usual manner so that as the timing pulses on lead 230 are supplied to the cores, the signal stored therein is advanced from one stage to the next.

Feedback mixer unit 146, connected between certain stages of the shift register and output lead 248 which is coupled to core 202, serves to provide binary input signals to the first physical shift register stage. The shift register and its feedback circuit may be considered as connected in either of one or two connections by means of a hypothetical double-pole, double-throw switch 232. This switch serves to connect the output signal of feedback mixer 146 on lead 148 to either the inhibit or set winding of core 202. With the switch positioned to connect the signal on lead 248 to the inhibit winding, the output signal from "ones generator" core 250 is applied to the set winding of core 202. When switch 232 is positioned to supply the signal on lead 248 to the input winding of core 202, the output signal from "ones generator" core 250 is open circuited. Actually "switch 232" is a part of the control selector switch 154, previously referred to.

Core 250 is referred to as a "ones generator" because it produces a binary "ONE" output pulse each time a drive pulse is supplied thereto by means of the clock pulse generator 128, FIG. 1, connected to lead 230. A B+ supply is connected to the set winding of the "ones generator" core 250 by means of a current limiting resistor to maintain the core in a condition of "positive" magnetization, except when the driving pulse is applied. Thus, a pulse on the output winding of core 250 is generated whenever a timing pulse occurs.

In FIG. 2, cores 214, 216 and 218 are illustrated as being connected as supplying signals to feedback mixer 146 at all times. However, it is to be understood that connections are actually established by means of the control selector switch 142, FIG. 1, and that feed backs from cores 214, 216, 218 and 222 might make an unacceptable condition, producing operating cycles shorter than $(2^{13}-1)$ or 8191 binary digits (bits).

The output winding of the last core 222 of shift register 102 is always connected to the set winding of core 252 and to the inhibit winding of core 254. The inhibit and set windings of cores 252 and 254, respectively, are supplied with the output signal from one of the cores of the shift register (in the illustrated example, core 214). The output windings of cores 252 and 254 are connected together through isolating diodes to terminal 256 and accordingly form a modulo two or half adder circuit which performs the Boolean Function $\overline{N}Z+N\overline{Z}$, which may be written as $N\oplus Z$; where N and Z represent the binary output signals from cores 222 and 214, respectively, $\overline{N}$ and $\overline{Z}$ represent the complement of the binary output signals from cores 222 and 214, respectively. The set and the inhibit windings of cores 258 and 260 are respectively supplied with a further output signal from one of the shift register stages (in the illustrated example, core 216). Hypothetical switch 262, connected to the output winding of core 220, in the illustrated example, couples the output signal from core 220 to either the input winding of core 260 plus the inhibit winding of core 258 or merely to the inhibit winding of core 258.

With hypothetical switch 262 in the position shown on the drawing, i.e. supplying the output signal from core 220 in parallel to the input winding of core 260 and to the inhibit winding of core 258, cores 258 and 260 serve as half-adders since they have their output windings connected to terminal 268 by means of isolating diodes. In the illustrated position of switch 262, cores 258 and 260 generate a binary signal representative of the Boolean function $X\oplus Y$; where X and Y are the output signals of cores 216 and 220, respectively. With switch 262 in its other position, alighting on contact 266, cores 258 and 260 are connected to generate a signal representative of the Boolean function $\overline{XY}$. In this position of switch 262, core 260 is effectively eliminated from the circuit. If it is desired to use only the non-linear mixing circuit, core 260 and its connections may be removed. It should be understood that the functions of "switch 262" are actually performed within the control selector switch 142, previously described.

The signal on terminal 256 from cores 252 and 254 is supplied to the set and inhibit windings of cores 270 and 272, respectively. Similarly, the signal on terminal 268 is supplied to the inhibit and set windings of cores 270 and 272, respectively. The signals produced in the output windings of cores 270 and 272 are supplied to terminal 274 by means of isolating diodes resulting in a further half adder circuit. The signal on terminal 274 may be fed to either the inhibit or set winding of core 202, depending upon the position of hypothetical switch 232, as previously described.

With hypothetical switch 262 in the position illustrated on the drawing, the feedback mixer serves as a linear combining or mixing circuit and produces a binary signal at terminal 274 representative of the Boolean function $N\oplus X\oplus Y\oplus Z$, where N, X, Y and Z are as previously defined. With the switch 262 located in the other position, alighting on contact 266, the feedback mixer is connected as a non-linear element and generates a signal representing the Boolean function $N\oplus Z\oplus(\overline{XY})$. The latter switch connection and resulting circuit configuration is preferable because of its non-linear characteristics. As previously described, the better mixing circuit requires the lesser amount of "hardware". In either configuration, it is apparent that each of the four mixer input terminals is responsive to a separate source of binary input signals, denominated as N, X, Y and Z, and that each of the binary input signals has the same bit rate and same repeating bit sequence length.

The terms linear and non-linear mixer or combining circuits are being employed with the meanings well known to those skilled in the art. In a linear mixer an output signal of one value is produced if a combination of input signals or the exact complement of these signals is supplied to the circuit. Thus, a half adder circuit is a linear mixer since a "zero" output signal is produced when both input signals are "zero" or "one" while a "one" output signal is produced if one input signal is "one" and the other "zero" no matter to which terminal they are applied. In a non-linear mixer this straight-forward relationship is not applicable. It is a characteristic of a linear mixer that it is possible to ascertain what the values of the input signals applied thereto are by mathematical analysis of the output signals. This characteristic does not apply to non-linear mixer circuits.

In order to increase the number of feedback combinations utilized in the machine it is possible to connect output signals from only two shift register stages to the feedback mixer 146. Under these conditions mixer 146 is connected as a single half adder circuit. This may be accomplished by connecting the output terminal 256 of the half adder circuit comprising cores 252 and 254 directly to lead 248 and disconnecting terminal 274 from lead 248. Normally and preferably, "4-tap" non-linear feedbacks are used.

The connections between the shift register stages and the input and output terminals of the feedback mixer are controlled by the control selector switch 142 described in connection with FIG. 1. Likewise, "switch 262" shown on FIG. 2 as a single-pole, double-throw switch is preferably incorporated as part of control selector switch 142. Output signals from two of the shift register stages are also selected to scrambling selector switches 178 and 180 by control selector switch 142. This latter is desirable for engineering reasons (to prevent "overloading" the output circuit of any given stage) as well as for security reasons.

An output signal from each of the feedback shift registers 102, 104, 106 and 108 is supplied to scrambling selector switch 178 and a further output signal from each of these registers is supplied to scrambling selector switch 180. As previously described, switches 178 and 180 feed their output signals to non-linear output mixers 186 and 188, respectively. Since these mixers are identical it is deemed necessary to describe only on of them.

Figure 3:
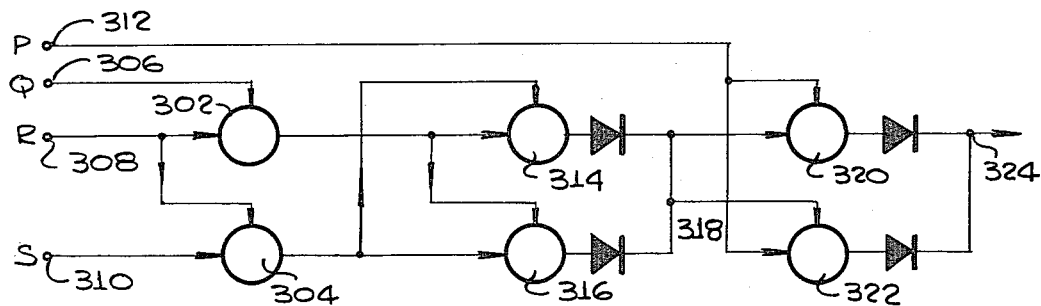
FIG. 3 is a block diagram of the non-linear output mixer utilized in FIG. 1.

FIG. 3 discloses a preferred embodiment of the non-linear output mixer employed in this invention. In FIG. 3, for purposes of clarity, the timing circuits have been omitted but it is to be understood that clock 128, FIG. 1, supplies timing pulses to the drive windings of each core disclosed in FIG. 3, in the manner shown in FIG. 2.

The non-linear output mixer of FIG. 3 comprises cores 302 and 304. The inhibit winding of core 302 is connected to terminal 306 while its input winding is connected to terminal 308. The signal produced by core 302 at its output winding is representative of the Boolean Function $\overline{Q}R$; where Q is the signal coupled to terminal 306 and R is the signal supplied to terminal 308. The inhibit winding of core 304 is also connected to terminal 308 and the input winding of this core is connected to terminal 310. The output signal of core 304 is representative of the Boolean function $\overline{R}S$; where R is as previously defined and S is the input signal applied to terminal 310. The terminals 306, 308, 310 and 312 are actually part of the scrambling selector switch and the signals thereon are output signals from each of the four feedback shift registers.

The output signals from cores 302 and 304 are supplied to a conventional half adder circuit comprising cores 314 and 316. The input winding of core 314 is coupled to the output winding of core 302 which is also coupled to the inhibit winding of core 316. The input and inhibit windings of cores 316 and 314, respectively, are supplied with a signal from the output winding of core 304. The outut windings of cores 314 and 316 are coupled to terminal 318 by means of isolating diodes so that the signal at terminal 318 is representative of the Boolean Function $\overline{Q}R \oplus \overline{R}S$. The signal at terminal 318 is supplied to the set and inhibit windings of cores 320 and 322, respectively. The inhibit and set windings of cores 320 and 322 are respectively coupled to terminal 312. The output windings of cores 320 and 322 are coupled together by means of isolating diodes to output terminal 324 so that the signal at terminal 324 is representative of the Boolean function $P \oplus \overline{Q}R \oplus \overline{R}S$; where P is the signal supplied to terminal 312 and Q, R and S are as previously defined. This output mixer is superior in performance and economy to non-linear output mixers previously utilized. Conventional output mixers would require at least three times the number of components employed herein to obtain the same optimum results.

Figure 4:
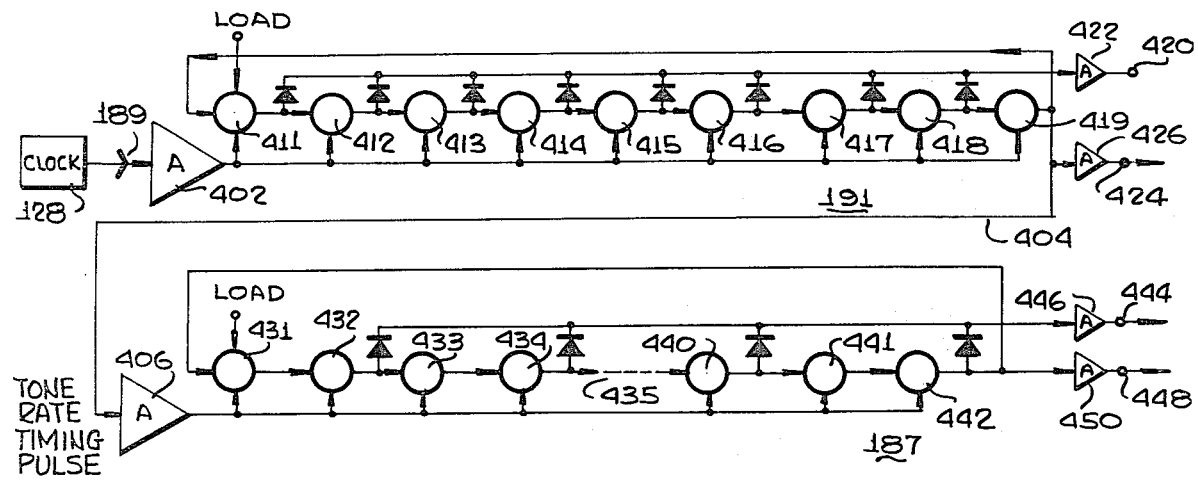
FIG. 4 is a block diagram of the timing and control network employed in FIG. 1.

FIG. 4 of the drawings discloses one embodiment of the timing and control apparatus which may be employed with this invention. The timing control apparatus comprises the clock 128 connected to programmer control unit 191 by means of lead 189 and driver amplifier 402. An output signal from programmer control unit 191 is supplied as the driving pulses for character timing unit 187 by means of lead 404 and driving amplifier 406.

Programmer control unit 191 comprises a conventional nine-stage ring counter having nine magnetic cores 411–419. The "advance" winding of each of the cores 411–419 is driven by an amplified signal from clock 128 so that the signal stored in one stage of the counter is successively transferred to the next stage when a timing pulse occurs because the current output terminal of each core is connected to the input terminal of the succeeding core. The current output terminal of core 419 is coupled back to the input terminal of core 411 so that recirculation of the signal in the various magnetic cores is accomplished.

To preload an initial signal in the shift register, the inhibit winding of core 411 is connected to the intermediate contact of switch 110. As the armature of switch 110 sweeps past the intermediate contact a signal is supplied to the inhibit winding of core 411. It is necessary to reverse the connections of the inhibit winding of core 411 so that the magnetic field produced in the core in response to the preloading voltage is of the same "polarity" as that which occurs when a signal is normally applied to the set winding. Thus, the inhibit winding of core 411 actually serves the same function as the set winding thereof but is only responsive to the operation of switch 110. The voltage output terminals of cores 411–418 are coupled together, via separate isolating diodes to terminal 420 by way of amplifier 422. In this manner, "inhibiting" (timing) pulses are produced at terminal 420 except for every ninth clock pulse produced by genenator 128.

The voltage output terminal of core 419 is coupled to terminal 424, via driving amplifier 426. Since core 419 supplies the only signal to terminal 424, the "reset" signal appearing at terminal 424 occurs only at the instant that no signal appears at terminal 420 (inhibit circuit).

Timing unit 187 comprises a 12 stage ring counter comprising magnetic cores 431–434 and 440–442 (only seven of these cores have been illustrated for purpose of convenience), the other cores being located between the cores 434 and 440 and represented by the dashed line 435). The "advance" windings of each of these cores are driven by the amplified signal from core 419 of programmer control unit 191. Preloading of core 431 is accomplished with switch 110, connected to the inhibit winding of the core, in exactly the same manner as preloading is accomplished for core 411 of programmer control unit 191. The current output terminal of each core, except core 442, is connected to the input terminal of the succeeding core so that the signal stored in each stage is advanced from one core to the next as pulses are produced on lead 404 from core 419. The current output terminal of core 442 is connected to the input terminal of the first core 431 so that recirculation of the stored signal results. It should thus be apparent that shifting of signals from one stage to the next in character timing unit 187 occurs once for each complete operating cycle of programmer control unit 191.

The "voltage output terminals" of alternate (even-numbered) stages of the shift register are coupled together, through blocking diodes to terminal 444 via amplifier 446, and the voltage output terminal of the last stage 442 is coupled to terminal 448 via driving amplifier 450. The timing signals obtained at terminals 444 and 448 are utilized in controlling the output components with which this control apparatus is to be utilized, i.e., the timing signal at terminal 444 is utilized to control the baud rate of the telegraphy signal handled by the tone hopping apparatus and the timing signal at terminal 448 is utilized to control the character rate of the telegraphy signal. Thus, the internally generated signals of the feedback shift registers and of the non-linear output mixers occur at a rate of 18 times (i.e. 9×2) that of the transmitted telegraphy baud rate.

Figure 5:
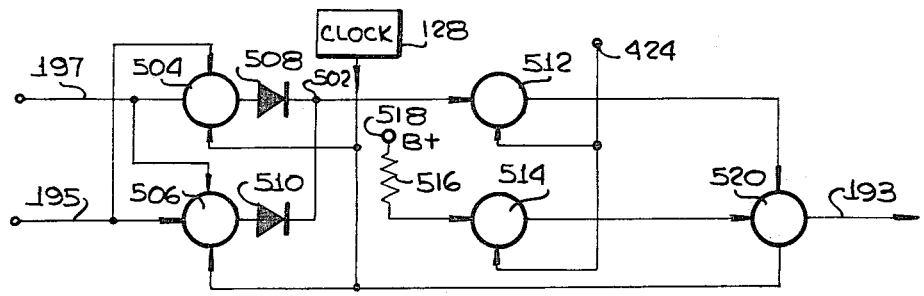
FIG. 5 is a block diagram of the comparator and correction unit according to a preferred embodiment of this invention.
Figure 6:
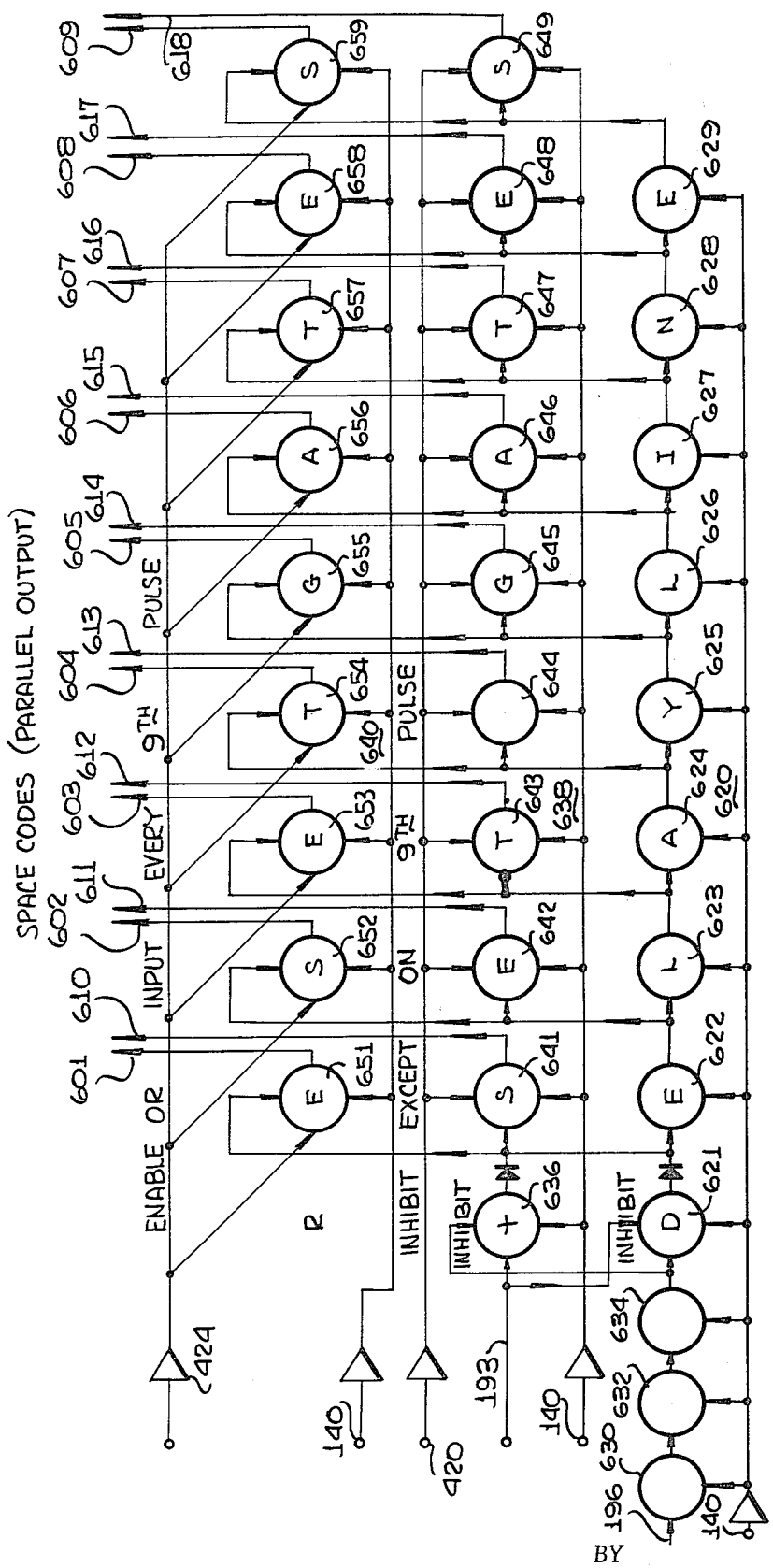
FIG. 6 is a block diagram of a preferred form of the serial to parallel converter.

FIG. 6 is an illustration of the "SPACE" serial to parallel converter 194 of FIG. 1 according to the present invention. This circuit converts the serial, binary signal on lead 196 into nine pairs of complementary, binary, parallel signals on leads 601–618. The frequency of the output signals equals one-ninth that of the serial signal applied to the converter. The circuit also serves to reverse one pair of signals if a correction pulse is applied to it on lead 193 from the comparator unit 198, FIG. 5.

The converter circuit comprises a shift register or delay line 620 having eight conventional magnetic core stages 622–629, plus a first stage consisting of two magnetic shift-register cores 621 and 636 connected as a binary half-adder or so-called "Exclusive-OR" circuit, previously described. The output winding of each shift register stage is connected to the input or set winding of the succeeding shift register stage, except for the output winding of the last stage 629. The drive winding of each core in the entire converter circuit is connected to terminal 140 which is coupled to the clock 128, FIG. 1. By these means, the signal stored in one stage of shift register 620 is transferred to the next stage upon each occurrence of a timing pulse from clock 128.

Cores 630, 632 and 634 are serially connected between the input winding of core 621 and lead 196 to which the converter input signal is applied. These cores delay the signal applied to the input winding 621 three bits of the clock signal products by pulse generator 128 so that the lag introduced by the correction circuit synchronizes the signals on leads 196 and 193 which are applied to the converter, thus maintaining the correct time relation between the correction and input pulses.

The correction pulse on lead 193 from core 520 of the correction unit 198, FIG. 5, is combined with the input signal to shift register 620 in a half adder circuit comprising cores 636 and 621, the first stage of the shift register. The signal on lead 193 is coupled to the inhibit and set windings of cores 621 nd 636, respectively. The converter input signal produced by the output winding of core 634 is coupled to the input and inhibit windings of cores 621 and 636, respectively. The output windings of cores 621 and 636 are coupled together by means of blocking rectifiers and supply the input winding of core 622 with its input signal. Thus, if a correction pulse is supplied on lead 193 to the converter circuit, the binary half adder comprising cores 621 and 636 serves to invert the signal from the output winding of core 634 at the time the correction pulse occurs. If no correction pulse is supplied to lead 193, there is no change in the input signal supplied to the shift register stages and the converter functions in its normal manner. The output windings of cores 621–628 are respectively coupled to a further pair of magnetic cores. The output windings of cores 621–628 separately supply signals to the input windings of a group of cores comprising "set" gates 638 and to the inhibit windings of a further group of cores comprising "reset" gates 640.

The set gates 638 comprise magnetic cores 641–649, the input windings of which are respectively coupled to the current output terminals of corresponding magnetic cores in delay line 620. Thus, the current output terminal of core 622 is coupled to the input winding of core 642 and the current output terminal of core 623 is coupled to the input winding of core 643. In a corresponding manner, the input windings of cores 643–649 are coupled to the current output terminals of cores 623–629.

The input winding of core 641 is connected by way of blocking rectifiers to the current output terminals of half adders 621 and 636. This connection serves to invert the polarity of the input signal supplied to core 641, in a manner similar to that for core 622, when a correction pulse occurs on lead 193.

The drive windings of cores 636 and 641–649 are coupled to terminal 140 so that signals may be read into and out of these cores each time a pulse is produced by clock 128. The inhibit windings of cores 641–649 are connected to terminal 420 and accordingly are actuated except on every ninth clock pulse. Accordingly, a signal is obtained from the output windings of cores 641–649 only once in nine pulses produced by clock 128. At all other times the signal applied to terminal 420 inhibits the "set" gate cores 638 and no signal may be obtained from their output windings. The voltage output terminals of cores 641–649 are respectively applied to output leads 610–618.

The "reset" gates 640 comprise nine magnetic cores 651–659, each having their respective inhibit windings coupled to a respective current output terminal of the cores of shift register 620. Thus, the inhibit winding of core 652 is coupled to the current output terminal of core 622 and the inhibit winding of core 653 is coupled to the current output terminal of core 623. In a similar manner, the inhibit windings of cores 654–659 are coupled to the current output terminals of cores 624–629. The input or set windings of cores 651–659 are all connected to terminal 424, driven by the amplified signal from the output winding of core 419, FIG. 4. Thus, the input windings of cores 651–659 are actuated only once for every nine pulses produced by clock 128. The drive windings of cores 651–659 are coupled to terminal 140 and clock 128. The voltage output terminals of cores 651–659 are respectively coupled to output leads 601–609 of the serial to parallel converter. The inhibit winding of core 651 is also coupled to the current output terminals of half-adder cores 621 and 636 in a manner similar to that in which the input winding of core 641 is coupled thereto.

Cores 651–659 invert the signal applied thereto on their inhibit windings when the timing pulses on lead 424 occur. Since the timing pulses on lead 424 occur every ninth clock-pulse, the parallel output voltage signals on leads 601–609 also occur every ninth clock pulse. In a slightly similar manner, output voltage signals from cores 641–649 are obtained in parallel on leads 610–618 on every ninth clock pulse, when inhibit pulses are not supplied thereto. It will be seen from the description of FIG. 4 and programmer control unit 191 thereof that the input pulses for cores 651–659 occur at the same time that the inhibit pulse normally supplied to cores 641–649 is excluded from the normal pulse train. Thus, the output signals from cores 641–649 and 651–659 occur at an identical time. Since the cores comprising "set" gate circuit 638 and those in the "reset" gate circuit 640 are connected to the same current output terminals of the shift register 620 stages, the signals on leads 601–609 are always the complement of those on lead 610–618. Thus, if the signal on lead 601 is a "one", then the signal on lead 610 is a "zero".

The "MARK" serial to parallel converter 190 is identical to that disclosed in FIG. 6 for converter 194 except that no correction pulse is applied to the circuit. Accordingly, lead 193 and core 636 and its associated circuitry may be excluded from the converter 190. Also the inhibit winding of core 621 may be eliminated.

The output voltage signals from the serial to parallel converters 190 and 194 are applied in parallel to flip-flops that control the switching of the tone generators utilized in the tone-hopping or other form of anti-jam transmission of signals. There is a flip-flop associated with each pair of output leads from the serial to parallel converter. The use of complementary set and reset signals eliminates a critical timing problem that arises if set pulses only are utilized with automatic resetting signals from the timing and control unit. With the set and reset control pulses employed in this invention, the electronic flip-flops in the tone generators remain in their previous condition until a pulse of the opposite polarity is received from the stage of the serial to parallel converter to which the particular flip-flop is connected. If preferred, high-speed, double-coil, "sensitive", polarized relays may be substituted for the flip flop.

By employing a serial to parallel converter having complementary pairs of output signals, the number of components utilized in the system is materially reduced because it is necessary to employ only two output mixers rather than eighteen.

FIG. 5 discloses a preferred form of the comparator unit 198 employed in FIG. 1. The signals on leads 195 and 197 are supplied to a magnetic half adder and produce an output signal at terminal 502 whenever the binary signals on leads 197 and 195 are different from each other. The half adder circuit comprises a pair of magnetic cores 504 and 506 wherein the inhibit and set windings of core 504 are respectively coupled to leads 195 and 197 and the inhibit and set windings of core 506 are respectively coupled to leads 197 and 195. The output windings of cores 504 and 506 are coupled to terminal 502 by means of conventional isolating diodes 508 and 510, respectively. The drive windings of cores 504 and 506 are coupled to clock 128 and accordingly these cores produce output signals at a rate equal to that produced in the feedback shift registers and the non-linear output mixers. The signal at terminal 502 is coupled to the input winding of buffer core 512, the drive winding of which is coupled to terminal 424. Since terminal 424 is coupled to core 419, FIG. 4, the drive winding of core 512 is actuated at one-ninth the frequency of cores 504 and 506 which comprise the half adder circuit, and in synchronism with the tone generators. "Ones generator" core 514, having its input winding connected through a current limiting resistor 516 to terminal 518, coupled to a source of B+, also has its drive winding actuated by the timing signal appearing at terminal 424. Accordingly, an output "ONE" signal is produced by core 514 in synchronism with the output "ONE" or "ZERO" signal generated by core 512.

Magnetic core 512 serves to store any signal that is supplied thereto, between the occurrence of timing pulses coupled to terminal 424. Thus, if there is one or more disagreements in the signals on leads 197 and 195, between the occurrence of timing pulses on terminal 424, an output signal is produced at terminal 502 and stored in core 512. This occurs because the state of magnetism in core 512 is shifted to a "positive" state in response to a signal at terminal 502 and does not return to the "negative" state until a pulse is supplied to its drive winding.

If a single disagreement occurs between the signals on leads 195 and 197 a "one" signal is obtained on the output winding of core 512 when the next timing pulse occurs at terminal 424. The output winding of core 512 is coupled to the inhibit winding of core 520, the latter having its set winding coupled to the output winding of core 514. The drive winding of inverter core 520 is connected to clock 128. Thus, since core 520 serves to invert the signal supplied to it by core 512, an output signal is produced on lead 193 only when the signals applied to terminals 195 and 197 are identical for the nine successive pulses and into the serial to parallel converters 190 and 194.

If there is any difference in the signals on leads 195 and 197 during this period, no pulse appears on lead 193. This is because inhibit pulses are supplied to core 520. When no inhibit pulse is supplied to core 520, a correction pulse occurs on lead 193. The output signal from core 520 occurs one timing pulse of clock 128 after the timing pulse applied to terminal 424, because of the delay associated with reading signals into and out of core 520.

While the system has been described in connection with magnetic core structure, it is to be understood that the equivalents thereof may be employed in the circuit if this is deemed desirable. Also, it is to be understood that the recognized Boolean algebra identities may be utilized with any circuit configuration which will yield the correct end result.

Binary "loops", linear mixers, and non-linear binary mixers have been the subject of considerable mathematical study, dating back to 1930 or possibly to 1801. Binary mixers of 6, 8, 10 etc. inputs are mathematically possible but engineeringly impracticable. Non-linear mixers of 4 inputs are the simplest ones that possess desirable performance characteristics but many of the 4-input non-linear mixers which have been investigated mathematically would involve undue circuit complexities and some of them have undesirable performance characteristics. From an engineering viewpoint it is desirable to use the same design of non-linear mixer for all purposes, but thus far no satisfactory design has been evolved. The feedback mixer disclosed above is perfect for its intended use but would be unsatisfactory as an output combining mixer, due to its unique performance characteristics. The output combining mixer disclosed above is perfect for its intended use but would be unsatisfactory as a feedback mixer, due to its unique performance characteristics. The two non-linear binary mixers disclosed herein are not only mathematically perfect for their intended purposes but are physically realizeable with comparatively simple circuitry.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus for producing multiple combinations of parallel output binary signals for controlling an anti-jam or other form of telegraphy system comprising four parallel feedback shift registers, a pair of serial to parallel converters, each having an input terminal, means for combining the output signals of said shift registers for producing two separate serial signals, means for coupling one of said serial signals to the input terminal of one of said converters, means for coupling the other of said serial signals to said input terminal of the other of said converters and means for changing the output signal of one of said converters when said separate signals are identical for a predetermined number of binary digits, said feedback shift registers having pluralities of separate stages and a feedback mixer having input terminals connected to the last and certain other three of said stages, and an output terminal connected to the first of said stages.

2. The apparatus of claim 1 wherein said feedback mixer comprises a non-linear circuit.

3. The apparatus of claim 2 further including a linear circuit and switch means for connecting either said linear or non-linear circuit to said input terminals.

4. The apparatus of claim 1 further including means for selectively preloading certain of said stages with binary signals.

5. The apparatus of claim 1 wherein said four parallel feedback shift registers comprise 13, 15, 17 and 19 actual stages.

6. The apparatus of claim 1 wherein said combining means for the output signals comprises non-linear mixer circuits.

7. The apparatus of claim 6 wherein said combining means further includes switch means for controlling the connections between said registers and said mixer.

8. In combination, a pair of serial to parallel converters, each having an input terminal, a plurality of shift register means for coupling a separate serial binary signal to the input terminal of each of said converters, a plurality of feedback mixer means each coupled to a respective one of said shift registers for applying feedback signals to said shift registers, means for comparing the separate signals, a clock pulse generator coupled to said converters and to said comparing means, said comparing means producing another binary signal when the signals applied thereto are identical for a predetermined plurality of clock pulses and means responsive to said another binary signal for changing the output signal of one of said converters.

9. In combination four feedback shift registers, each having a unique number of separate stages, a non-linear mixer coupled to one of said separate shift register stages for combining the output signals of said shift register, said mixer including four input terminals, one output terminal and a logical circuit for producing at said output terminal a binary signal representative of $P + \overline{Q}R + \overline{R}S$ wherein P, Q, R and S are the signals respectively supplied to said input terminals from the respective four feedback shift registers.

10. The combination of claim 9 wherein each of said feedback registers comprises a further non-linear mixer circuit having input terminals connected to the last and certain other three of said stages and an output terminal connected to the first of said stages.

11. The combination of claim 10 further comprising a linear feedback mixer circuit having input and output terminals and switch means for selectively connecting certain of said stages to the input terminals of either said linear or non-linear feedback mixer circuits.

12. The combination of claim 10 wherein one of said further non-linear mixer circuits comprises four input terminals and a logical circuit for producing a binary signal representative of $N \oplus Z \oplus \overline{X}Y$ at said output terminal, wherein N, X, Y and Z are the binary signals respectively supplied to said four input terminals, N representing the last stage and X, Y, and Z selected stages of the associated shift register.

13. The combination of claim 9 further including switch means connected between said mixer and said registers for feeding the input terminals of said mixer from different output stages of said registers.

14. The combination of claim 9 further including means for selectively preloading binary signals in certain stages of said shift registers.

15. Code pulse producing apparatus comprising a shift register having more than five stages, a non-linear feedback mixer circuit having four input terminals, an output terminal and a logical circuit for producing a binary signal representing $\overline{X}Y \oplus N \oplus Z$ at said output terminal, wherein N, X, Y and Z are the signals applied to the respective input terminals, control selector switch means for coupling the signals of four of said stages to said input terminals, and means for coupling the binary signal at said output terminal to the first of said stages, N representing the last stage and X, Y and Z selected stages of said shift register.

16. The apparatus of claim 15 further including means for selectively preloading certain stages of said shift register.

17. The apparatus of claim 15 further comprising a linear feedback mixer including a plurality of input terminals and switch means for coupling the output signals of said stages to the input terminals of either the linear or non-linear feedback mixers.

18. Code pulse producing apparatus comprising a shift register having a plurality of separate stages, a linear feedback mixer, a non-linear feedback mixer, each of said mixers having a number of input terminals and an output terminal, switch means for coupling signals from less than all of said stages either to the input terminals of said linear mixer or to the input terminals of said non-linear mixer and control selector switching means for coupling the signal at said output terminal to either load or inhibit loading of the first of said stages.

19. A feedback combining circuit comprising a source of four serial binary signals, denominated as N, X, Y and Z, each of said signals having the same bit rate and same repeating bit sequence lengths, a non-linear mixer circuit having four input terminals, an output terminal, and a logical circuit for producing a binary signal representative of $N \oplus Z \oplus \overline{X}Y$ at said output terminal, and control selector switch means for coupling the binary signals N, X, Y and Z to said four input terminals.

20. The circuit of claim 19 wherein said logical circuits include a first binary half adder circuit for combining the signals N and Z to produce a binary signal $N \oplus Z$, an inhibit circuit for combining the signals X and Y to produce a binary signal representing $\overline{X}Y$ and a second half adder circuit for combining the signals $N \oplus Z$ and $\overline{X}Y$ to produce a binary signal representing $\overline{X}Y \oplus N \oplus Z$.

21. The circuit of claim 20 wherein each of said combining circuits comprises a magnetic core having set, output, inhibit, and advance windings a clock pulse source, and means responsive to said clock pulse source for activating all of said advance windings substantially simultaneously.

22. The circuit of claim 21 further including another inhibit circuit for combining the signals X and Y to produce a binary signal representing $\overline{X}\overline{Y}$ and switch means for coupling the X signal to said another inhibit circuit.

23. The circuit of claim 22 wherein said logical circuit includes five magnetic cores, each of said cores having set, inhibit and output windings, a first half adder circuit comprising a first and second of said cores for combining the signals N and Z to produce a binary output signal representing $N \oplus Z$, an inhibit circuit comprising the third of said cores for combining the signals X and Y to produce a binary output signal representing $\overline{X}Y$ and a second half adder comprising the fourth and fifth of said cores for combining the output signals of said first half adder circuit and of said inhibit circuit.

24. Code pulse producing apparatus comprising a shift register having at least five magnetic core stages, each of said core stages having input and output windings, the first stage core including an inhibit winding, a non-linear feedback mixer having four input terminals coupled to certain of said output windings and including a logical circuit comprising magnetic cores for producing a binary output signal representing $N+Z+\overline{X}Y$, selector switch selector means for coupling said N, X, Y and Z signals to said four input terminals, and means for selectively feeding said output signal to either the input or the inhibit winding of the first stage of said shift register core stages, N representing the last stage and X, Y and Z selected stages of the associated shift register.

25. Apparatus for comparing two separate simultaneously occurring signals over a predetermined count of binary digits comprising nonlinear mixer circuit means for producing an output signal only when said separate signals are different at any time, feedback shift register means for temporarily storing said output signal, and control selector switch means for sampling said storing means only once during said predetermined count.

26. Apparatus for comparing two separate simultaneously occurring binary signals over a predetermined number of recurring pulses comprising a binary half adder circuit for combining said two signals to thereby produce a combined signal, feedback shift register means for storing said combined signal, and selector switch means for sampling said storing means only once during said number of recurring pulses.

27. Apparatus for comparing two separate simultaneously occurring binary signals, comprising a clock pulse generator for producing clock signals, a pulse frequency divider for producing timing signals at a certain sub-multiple of the clock rate, comparator and correction circuit means responsive to said timing signals for producing an output signal whenever said two separate binary signals are different, said output signal having a frequency equal to the said timing signals and serial to parallel converter means responsive to said clock signals for storing said output signal and for producing an output binary signal.

28. The apparatus of claim 27 wherein said storing means comprises a magnetic core having set and drive windings, means for coupling said timing signals to said drive winding and means for coupling said combined signal to said set winding.

29. The apparatus of claim 27 further comprising another circuit responsive to said clock signal for inverting said output binary signal.

30. Apparatus for generating a coded signal comprising a shift register having a plurality of stages, the first of said stages including a binary half adder circuit having means for inverting the input signal of said shift register, a logical combining network having a number of input terminals and an output terminal, magnetic core means for coupling output signals from certain of said stages to said input terminals and comparator and correction circuit means for coupling the signal at said output terminal to inhibit activation of the said inverting means.

31. The apparatus of claim 30 wherein said first stage comprises an input circuit and an inhibit circuit, and switch means for alternatively coupling the signal at said output terminal to said input circuit and to said inhibit circuit.

32. The apparatus of claim 31 wherein each stage of said register comprises a magnetic core, the core of said one stage including inhibit and set windings.

33. Apparatus for simultaneously producing N pairs of complementary binary signals in response to a serial binary signal during N occurrences of clock pulses in a timing cycle, comprising an array of cores forming an N stage delay line responsive to said serial signal, another array of cores forming N inhibit circuits, N array of cores inverter circuits, each of the inverter circuits being coupled to a respective one of the inhibit circuits, means for inhibiting each of said inhibit circuits except on the Nth clock pulse timing cycle, and means for actuating each of said inverter circuits on the Nth clock pulse of the timing cycle.

34. The apparatus of claim 33 wherein each stage of said delay line, each inhibit circuit and each inverter circuit comprises a magnetic core, the cores of said inhibit and inverter circuits having advance, set, inhibit, and output windings.

35. Apparatus for generating a plurality of simultaneous binary signals from a pair of separate serial binary signals comprising, half adder means for comparing the two serial signals for a predetermined count and for generating a correction signal when said signals are identical for said count, a pair of serial to parallel converters, shift register means in each of said converters for feeding one of said serial signals to one of said converters and the other of said serial signals to the other of said converters, one of said converters including binary half adder means for inverting one binary digit of the serial signal fed to said converter when said correction signal is generated.

36. The apparatus of claim 35 wherein said inverting means comprises a half adder, one input of which is the said correction signal and the other input is said serial signal, one bit of which is to be inverted.

37. Apparatus for deriving multiple combinations of parallel output binary signals for controlling an anti-jam or other form of telegraphy system comprising feedback shift register means for generating plural sequences of pseudo-random binary digits having pre-determined lengths, said lengths being related to each other by integers having one as their only common factor, non-linear output mixer circuit means for combining said sequences to derive two separate serial signals, a pair of serial to parallel converters each having an input terminal, means for coupling one of said serial signals to the input of one of said converters, means for coupling the other of said serial signals to the input of the other of said converters, and comparator and correction circuit means for changing the output signal of one of said converters when said separate signals are identical for a predetermined number of binary digits.

38. Apparatus for deriving multiple combinations of parallel output binary signals for controlling an anti-jam or other form of telegraphy system comprising feedback shift register circuit means for generating plural sequences of pseudo-random binary digits having predetermined lengths, non-linear output mixer circuit means for combining said sequences to derive two separate signals, a pair of serial to parallel converters each having an input terminal, means for coupling one of said serial signals to the input of one of said converters, means for coupling the other of said serial signals to the input of the other of said converters, and comparator and correction circuit means for changing the output signal of said converters when said separate signals are identical for a predetermined number of binary digits.

39. The apparatus of claim 1 wherein the number of stages of said shift registers are related to each other by integers having one as their only common factor.

40. The combination of claim 9 wherein the number of stages of said shift registers are related by co-prime integers.

41. In combination, scrambling selector switch means for generating, four sequences of pseudo-random binary digits having predetermined lengths, said lengths being related to each other by co-prime integers, said sequences being denominated P, Q, R, and S, respectively, and non-linear output mixer means for combining said sequences in accordance with the Boolean function $P+\overline{Q}R+\overline{R}S$.

42. The combination of claim 41 wherein said means for combining includes a first inhibit circuit for combining the signals R and S to produce a binary output signal representing $\overline{R}S$, a second inhibit circuit for combining the signals Q and R to produce a binary output signal representing $\overline{Q}R$, a first binary half adder circuit for combining the output signals of said first and second inhibit circuits to thereby produce a combined signal and a second half adder circuit for combining the P signal and the combined signal.

43. The apparatus of claim 42 wherein each of said circuits comprises a magnetic core having set, inhibit, drive, and output windings, a clock pulse source, and means responsive to said clock pulse source for activating all of said advance windings substantially simultaneously.

44. Pulse code producing apparatus comprising a shift register delay element having at least five stages, a non-linear feedback mixer circuit having four input terminals, an output terminal and a switch means for producing a binary signal representing $\overline{X}Y+N+Z$ at said output terminal, wherein N, X, Y and Z are the signals applied to the respective input terminals; means for coupling the signals of four of said stages to said input terminals, and further switch means for coupling the binary signal at said output terminal to the first of said stages, N representing the last stage and X, Y and Z selected stages of said shift register.

45. Pulse code producing apparatus comprising a shift register delay element having at least ten separate stages, a linear feedback mixer, a non-linear feedback mixer, each of said mixers having a number of input terminals and an output terminal, control selector switch means for coupling signals from certain of said stages to either the input terminals of said linear mixer or to the input terminals of said non-linear mixer, and further control selector switching means for coupling the signal at the output terminal of the mixer to which said signals are coupled to either load or inhibit loading of the first of said stages.

46. Apparatus for generating a coded signal comprising a shift register delay element having a plurality of stages, the first of said stages including a magnetic core circuit having means for inverting the input signal of said element, a switch having a number of input terminals and an output terminal, means for coupling output signals from certain of said stages to said input terminals, and further circuit means for coupling the signal at said output terminal to inhibit activation of said inverting means.

47. Apparatus for producing multiple combinations of parallel, binary signals for controlling tone generators in telegraphy transmitters comprising a plurality of feedback shift registers for producing binary output signals, non-linear output mixer circuit means for combining the output signals from each of said shift registers to form a serial binary signal, and further circuit means for converting the serial signal into said parallel, binary signals, wherein each of said registers includes a different number of stages, the number of stages in each register being related by co-prime integers.

48. Apparatus for producing multiple combinations of parallel, binary signals for controlling tone generators in telegraphy transmitters comprising a plurality of feedback shift registers for producing binary output signals, non-linear output mixer circuit means for combining the output signals from each of said shift registers to form a serial binary signal, and further circuit means for converting the serial signal into said parallel, binary signals, wherein at least one of said shift registers includes at least five stages and a mixer responsive to the signal from four of said stages, said mixer deriving the Boolean function $N+Z+\overline{X}Y$, where N represents the output signal of the last shift register stage, and X, Y and Z represent the output signals of other, differing shift register stages.

49. Apparatus for producing multiple combinations of parallel, binary signals for controlling tone generators in telegraphy transmitters comprising a plurality of feedback shift registers for producing binary output signals, non-linear output mixer circuit means for combining the output signals from each of said shift registers to form a serial binary signal, and further circuit means for converting the serial signal into said parallel, binary signals, wherein at least one of said shift registers includes at least five stages and a mixer responsive to the signal from four of said stages, said mixer deriving the Boolean function $N+X+Y+Z$, where N represents the output signal of the last shift register stage, and X, Y and Z represent the output signals of other differing shift register stages.

50. Apparatus for producing multiple combinations of parallel, binary signals for controlling tone generators in telegraphy transmitters comprising four feedback shift registers for producing binary output signals, non-linear output mixer circuit means for combining the output signals from each of said shift registers to form a serial binary signal, and further circuit means for converting the serial signal into said parallel, binary signals, wherein said means for combining derives the Boolean function $P+\overline{Q}R+\overline{R}S$, where P, Q, R and S are the output signals of said shift registers.

51. The apparatus of claim 50 wherein at least one of said shift registers includes at least five stages and a mixer responsive to the signal from four of said stages, said mixer deriving the Boolean function $N\oplus Z\oplus \overline{X}Y$, where N represents the output signal of the last shift register stage, and X, Y and Z represent the output signals of other, differing shift register stages.

52. Apparatus for producing multiple combinations of parallel binary signals comprising switch means for generating plural sequences of pseudo-random binary digits having predetermined lengths, said lengths being related to each other by co-prime integers, feedback mixer circuit means for combining said sequences to form a serial binary signal, and further circuit means for converting the serial signal to parallel, binary signals.

53. The apparatus of claim 52 wherein the number of plural sequences equals four, and said means for combining derives the Boolean function $P\oplus\overline{Q}R\oplus\overline{R}S$, where P, Q, R and S represent the values of said four sequences.

54. In combination, a pair of serial to parallel converters, one converter generating mark-code signals, the other converter generating space-code signals, each converter having an input terminal and normally deriving outputs in a predetermined manner in response to the signal applied to its input terminal, switch means for deriving a pair of separate serial binary signals, feedback mixer circuit means for coupling one of said signals to the input terminal of one of said converters, feedback mixer circuit means for coupling the other of said signals to the input terminal of the other of said converters, and comparator and correction circuit means responsive to said separate signals for changing the output signal of one of said converters from said predetermined manner in response to said separate signals being identical for a predetermined number of binary bits.

55. Apparatus for producing multiple combinations of first parallel binary output signals for controlling mark codes for telegraphy transmitter code generators and second parallel binary output signals for controlling space codes for said telegraphy transmitter code generator comprising a plurality of feedback shift registers, each of said shift registers deriving a first and a second binary signal, magnetic core circuit means for combining the first signal deriving from each of said shift registers to form a third serial binary signal, magnetic core circuit means for combining the second signal deriving from each of said shift registers to form a fourth serial binary signal, further magnetic core circuit means responsive to said third serial binary signal for converting said third binary signal into said first parallel binary output signals, and still further magnetic core circuit means responsive to said fourth serial binary signal for converting said fourth serial binary signal into said second parallel binary output signals.

56. The apparatus of claim 55 wherein four feedback shift registers are provided, and each of said combining means comprises a non-linear mixing circuit having four input terminals.

57. Apparatus for producing multiple combinations of parallel binary signals for controlling tone generators in telegraphy transmitters comprising a plurality of feedback shift registers for deriving a plurality of different serial binary output signals, load selector switch means for preloading selected stages of said shift registers with binary ones to control the output derived from each of said shift registers, non-linear mixer circuit means for periodically shifting the preloaded binary ones through the stages of said shift registers so the serial output signal deriving from each of said shift registers has the same bit rate, said means for shifting and said preloading means feeding the only signals to each of said shift registers, said non-linear mixer circuit means also combining said plural serial binary output signals from each of said plurality of shift registers to form another serial binary signal, and serial to parallel converter circuit means responsive to said another serial binary signal for converting said another serial binary signal into said multiple parallel binary signals.

58. The apparatus of claim 57 wherein each of said feedback shift registers comprises a plurality of separate stages and a feedback mixer, said feedback mixer having plural input terminals connected to certain of said stages and an output terminal connected to the first of said stages.

59. The apparatus of claim 58 wherein said feedback mixer comprises a four input non-linear circuit.

60. The apparatus of claim 57 wherein said combining means comprises a non-linear mixer circuit.

61. The apparatus of claim 60 wherein said combining means further includes switch means for controlling the connections between said registers and said mixer.

62. In combination, shift register and feedback mixer circuit means for generating a plurality of sequences of pseudo-random binary digits having predetermined lengths, said lengths being related to each other by co-prime integers, and non-linear mixer circuit means for combining said sequences in accordance with a non-linear mixing function.

63. A system for deriving a repeating sequence of binary zero and one bits comprising a multi-stage shift register, each of said stages deriving a first binary output signal, a non-linear mixing circuit simultaneously responsive to the first output signals of a plurality of selected ones of said stages for simultaneously non-linearly combining the first output signals deriving from said selected ones of said stages to derive a second binary output signal, selector switch means for feeding said second output signal to the first stage of said shift register to load said first stage with binary bits, a clock pulse generator circuit for providing a single source of shifting pulses, further selector switch means for feeding said pulses simultaneously to each of said stages and said mixing circuit to shift simultaneously the binary signals between adjacent ones of said stages, from all of said selected stages to said mixing circuit, and from said mixing circuit to said first stage.

* * * * *